(12) United States Patent
Marueli et al.

(10) Patent No.: US 12,235,118 B2
(45) Date of Patent: Feb. 25, 2025

(54) SYSTEM FOR GENERATING TRAVEL ROUTE TO BE SERVICED BY PRIMARY TRANSPORTATION SERVICE AND SECONDARY TRANSPORTATION SERVICE

(71) Applicant: Lyft, Inc., San Francisco, CA (US)

(72) Inventors: Sunny Marueli, Nes Ziona (IL); Talmon Marco, Tel Aviv (IL)

(73) Assignee: Lyft, Inc., San Francisco, CA (US)

( * ) Notice: Subject to any disclaimer, the term of this patent is extended or adjusted under 35 U.S.C. 154(b) by 484 days.

(21) Appl. No.: 16/793,353

(22) Filed: Feb. 18, 2020

(65) Prior Publication Data

US 2020/0256691 A1 Aug. 13, 2020

Related U.S. Application Data

(63) Continuation of application No. 15/995,609, filed on Jun. 1, 2018, now Pat. No. 10,563,996, which is a
(Continued)

(51) Int. Cl.
*G01C 21/34* (2006.01)
*G01C 21/20* (2006.01)
(Continued)

(52) U.S. Cl.
CPC ......... *G01C 21/3484* (2013.01); *G01C 21/20* (2013.01); *G01C 21/34* (2013.01);
(Continued)

(58) Field of Classification Search
CPC ............... G01C 21/34; G01C 21/3407; G01C 21/3423; G01C 21/343; G01C 21/3453;
(Continued)

(56) References Cited

U.S. PATENT DOCUMENTS 8,775,070 B1 7/2014 Bhatia
9,261,374 B2 2/2016 Mundinger et al.
(Continued)

FOREIGN PATENT DOCUMENTS

EP 2708850 A1 * 3/2014 ......... G01C 21/3415

OTHER PUBLICATIONS

U.S. Appl. No. 14/985,580, May 15, 2017, Office Action.
(Continued)

*Primary Examiner* — Russell Frejd
*Assistant Examiner* — Sara J Lewandroski
(74) *Attorney, Agent, or Firm* — Keller Preece PLLC

(57) ABSTRACT

In one embodiment a pickup location and a destination location associated with a subscriber to a first transportation service are accessed. A first route from the pickup location to the destination location is identified, the first route comprising a plurality of segments, wherein a first segment of the plurality of segments of the first route is to be serviced by a driver of the first transportation service using a first type of transportation vehicle, and wherein a second segment of the plurality of segments of the first route is to be serviced by a second transportation service using a second type of transportation vehicle. The driver of the first transportation service is directed to service the first segment of the plurality of segments of the first route.

20 Claims, 5 Drawing Sheets

Related U.S. Application Data continuation of application No. 14/985,718, filed on Dec. 31, 2015, now Pat. No. 9,989,374, which is a continuation of application No. 14/985,580, filed on Dec. 31, 2015, now Pat. No. 9,857,190.

(51) Int. Cl.
    *G06Q 10/02*     (2012.01)
    *H04L 29/08*     (2006.01)
    *H04L 67/12*     (2022.01)

(52) U.S. Cl.
    CPC ......... *G01C 21/3423* (2013.01); *G06Q 10/02* (2013.01); *H04L 67/12* (2013.01)

(58) Field of Classification Search
    CPC ............ G01C 21/3461; G01C 21/3469; G01C 21/3476; G01C 21/3484; G01C 21/3492; G06Q 10/02; G06Q 10/025
    See application file for complete search history.

(56) References Cited

U.S. PATENT DOCUMENTS

| | | | |
|---|---|---|---|
| 9,857,190 B2 | 1/2018 | Marueli et al. | |
| 9,989,374 B2 | 6/2018 | Marueli et al. | |
| 10,563,996 B2 | 2/2020 | Marueli et al. | |
| 2003/0109266 A1* | 6/2003 | Rafiah | G01C 21/3423 455/456.1 |
| 2004/0158483 A1 | 8/2004 | Lecouturier | |
| 2008/0014908 A1 | 1/2008 | Vasant | |
| 2008/0059061 A1* | 3/2008 | Lee | G01C 21/3461 340/995.19 |
| 2009/0005963 A1 | 1/2009 | Jarvinen | |
| 2009/0030715 A1* | 1/2009 | Robb | G01C 21/3423 705/5 |
| 2009/0192851 A1 | 7/2009 | Bishop | |
| 2011/0246246 A1 | 10/2011 | Johnson | |
| 2012/0004841 A1* | 1/2012 | Schunder | G01C 21/3661 701/412 |
| 2012/0233246 A1 | 9/2012 | Guemez | |
| 2012/0239452 A1 | 9/2012 | Trivedi et al. | |
| 2012/0290337 A1 | 11/2012 | Helmy et al. | |
| 2013/0054281 A1 | 2/2013 | Thakkar et al. | |
| 2013/0218455 A1 | 8/2013 | Clark | |
| 2013/0226365 A1 | 8/2013 | Brozovich | |
| 2013/0262222 A1 | 10/2013 | Gibson et al. | |
| 2014/0173511 A1 | 6/2014 | Lehmann et al. | |
| 2014/0188788 A1 | 7/2014 | Bridgen et al. | |
| 2014/0207375 A1 | 7/2014 | Lerenc | |
| 2014/0278086 A1* | 9/2014 | San Filippo | G01C 21/3492 701/527 |
| 2015/0081581 A1 | 3/2015 | Gishen | |
| 2015/0100238 A1 | 4/2015 | Cai et al. | |
| 2015/0154810 A1 | 6/2015 | Tew et al. | |
| 2015/0204684 A1 | 7/2015 | Rostamian et al. | |
| 2015/0254581 A1 | 9/2015 | Brahme | |
| 2015/0294238 A1* | 10/2015 | Benque | G06Q 10/025 705/6 |
| 2015/0323329 A1* | 11/2015 | Lord | G01C 21/34 701/408 |
| 2015/0323330 A1 | 11/2015 | Lord et al. | |
| 2015/0323331 A1 | 11/2015 | Lord et al. | |
| 2015/0325128 A1 | 11/2015 | Lord et al. | |
| 2015/0345951 A1* | 12/2015 | Dutta | G01C 21/3469 701/400 |
| 2016/0026936 A1 | 1/2016 | Richardson et al. | |
| 2016/0042303 A1 | 2/2016 | Medina et al. | |
| 2016/0132792 A1 | 5/2016 | Rosnow | |
| 2016/0195403 A1* | 7/2016 | Tuukkanen | G01C 21/3423 701/533 |
| 2016/0231129 A1 | 8/2016 | Erez et al. | |
| 2016/0320194 A1 | 11/2016 | Liu et al. | |
| 2016/0320195 A1* | 11/2016 | Liu | H04W 4/021 |
| 2016/0321771 A1 | 11/2016 | Liu et al. | |
| 2016/0356615 A1 | 12/2016 | Arata et al. | |
| 2016/0364679 A1 | 12/2016 | Cao | |
| 2016/0364823 A1 | 12/2016 | Cao | |
| 2017/0053209 A1* | 2/2017 | Céret | G01C 21/3423 |
| 2017/0061801 A1 | 3/2017 | Huang et al. | |
| 2017/0138749 A1 | 5/2017 | Pan et al. | |

OTHER PUBLICATIONS

U.S. Appl. No. 14/985,580, Aug, 29, 2017, Notice of Allowance.
U.S. Appl. No. 14/985,718, Sep. 19, 2017, Office Action.
U.S. Appl. No. 14/985,718, Feb. 8, 2018, Notice of Allowance.
U.S. Appl. No. 15/995,609, Oct. 8, 2019, Notice of Allowance.

\* cited by examiner

SYSTEM FOR GENERATING TRAVEL ROUTE TO BE SERVICED BY PRIMARY TRANSPORTATION SERVICE AND SECONDARY TRANSPORTATION SERVICE

CLAIM OF PRIORITY

This application is a continuation of U.S. application Ser. No. 15/995,609, filed Jun. 1, 2018, which is a continuation of U.S. application Ser. No. 14/985,718, filed Dec. 31, 2015 and issued as U.S. Pat. No. 9,989,374 on Jun. 5, 2018, which is a continuation of U.S. application Ser. No. 14/985,580, filed on Dec. 31, 2015 and issued as U.S. Pat. No. 9,857,190 on Jan. 2, 2018, wherein the entire contents of both are hereby incorporated by reference.

TECHNICAL FIELD

This disclosure relates in general to the field of mobile applications and, more particularly, to a system for generating a travel route to be serviced by a primary transportation service and a secondary transportation service.

BACKGROUND

A transportation service may utilize a plurality of drivers that fulfill passenger requests for transportation. A transportation service may provide one or more mobile applications that facilitate the efficient pairing of passengers and drivers. The transportation service may receive a transportation request and select a driver to fulfill the request based on information associated with the transportation request and information associated with the driver.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which.

DETAILED DESCRIPTION OF EXAMPLE EMBODIMENTS

Overview

In one embodiment a pickup location and a destination location associated with a subscriber to a first transportation service are accessed. A first route from the pickup location to the destination location is identified, the first route comprising a plurality of segments, wherein a first segment of the plurality of segments of the first route is to be serviced by a driver of the first transportation service using a first type of transportation vehicle, and wherein a second segment of the plurality of segments of the first route is to be serviced by a second transportation service using a second type of transportation vehicle. The driver of the first transportation service is directed to service the first segment of the plurality of segments of the first route.

Example Embodiments

Figure 1:
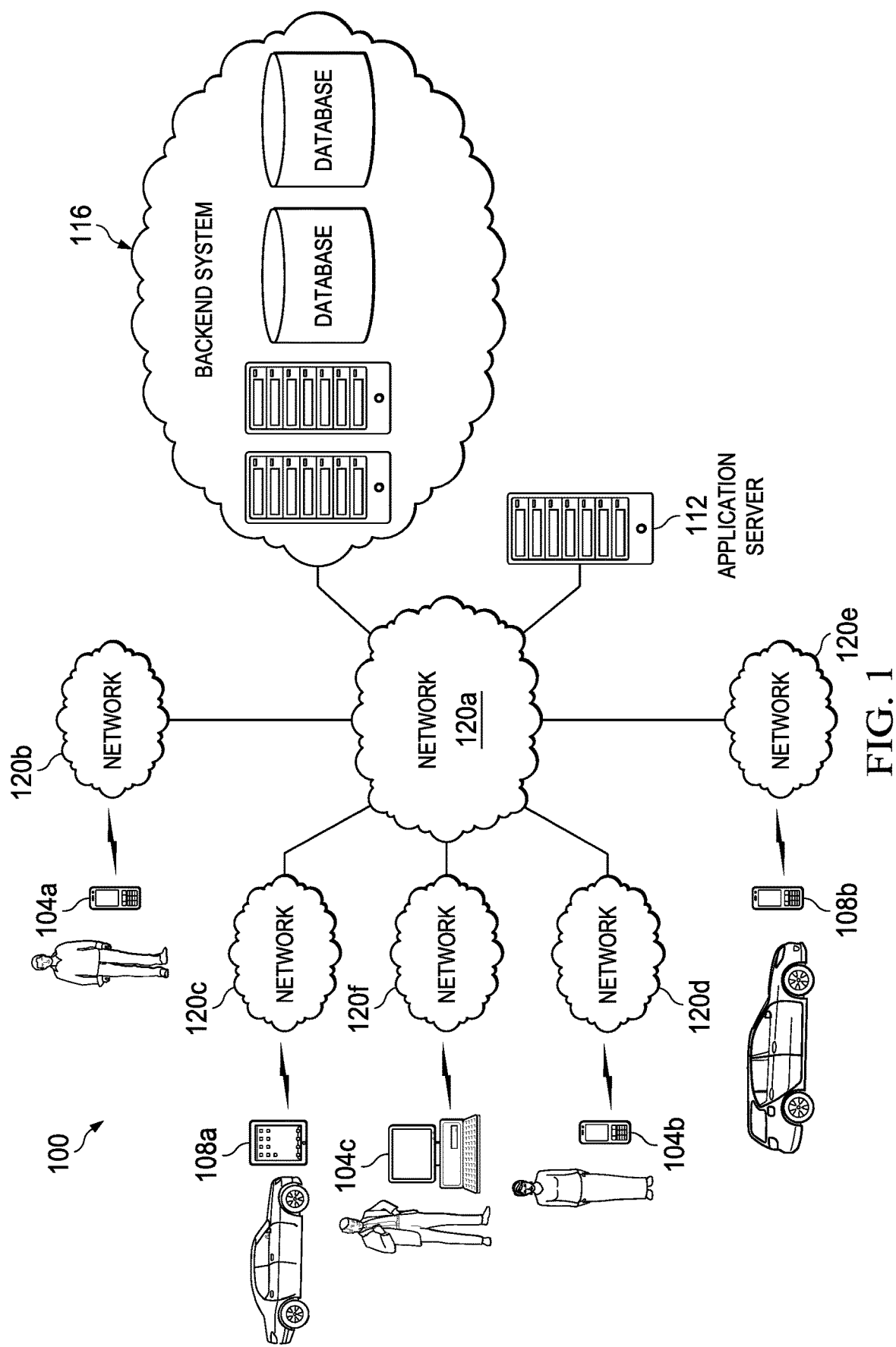
FIG. 1 illustrates a block diagram of a system for generating travel routes to be serviced by a primary transportation service and a secondary transportation service in accordance with certain embodiments.

FIG. 1 illustrates a block diagram of a system 100 for generating travel routes to be serviced by a primary transportation service and a secondary transportation service in accordance with certain embodiments. Although various embodiments may include any number of drivers, passengers, and associated devices, system 100 depicts three passengers having associated passenger computing devices 104 and two drivers having associated driver computing devices 108. The computing devices are coupled through various networks 120 to an application server 112 and a backend system 116.

Various embodiments of the present disclosure may enhance the experience of a passenger associated with a transportation service by generating a route for the passenger that includes at least one segment serviced by one or more drivers of a primary transportation service and at least one other segment serviced by a second transportation service. Such embodiments may allow reduction of the cost and/or travel time of the route for the passenger. As one example, a primary transportation service may design a route in which a passenger is picked up by a first driver associated with the primary transportation service at the passenger's home and dropped off at a bus or train terminal, rides a bus or train to a different terminal, and is then picked up by a second driver associated with the primary transportation service and transported to the passenger's place of business. As another example, the primary transportation service may design a route in which a passenger is picked up by a first driver associated with the primary transportation service at the passenger's home and dropped off at an airport terminal, takes a flight to another city, and is then picked up by a second driver associated with the primary transportation service and transported to the passenger's hotel.

Various embodiments may provide technical advantages such as minimizing communications required by a passenger computing device to arrange a route with multiple transportation segments, more efficient use of fuel or power of transportation vehicles, or other technical advantages.

Computing devices 104 and 108 may include any electronic computing device operable to receive, transmit, process, and store any appropriate data. In various embodiments, computing devices 104 and 108 may be mobile devices or stationary devices. As examples, mobile devices may include laptop computers, tablet computers, smartphones, personal digital assistants, smartwatches, computers integrated with a vehicle, computers integrated with clothing, and other devices capable of connecting (e.g., wirelessly) to one or more networks 120 while stationary devices may include desktop computers, televisions, or other devices that are not easily portable. Devices 104 and 108 may include a set of programs such as operating systems (e.g., Microsoft Windows, Linux, Android, Mac OSX, Apple iOS, UNIX, or similar operating system), applications, plug-ins, applets, virtual machines, machine images, drivers, executable files, and other software-based programs capable of being run, executed, or otherwise used by the respective devices. Each computing device can include at least one graphical display and user interface allowing a user to view and interact with applications and other programs of the computing device. In a particular embodiment, computing device 108 may be a hardened device that is configured to only run a driver application using a specialized operating system (e.g., a modified version of Android). In one embodiment, a transportation service may issue or otherwise facilitate the provision of hardened devices to its drivers, but restrict the functionality of the devices to the driver application (i.e., the devices may be locked down so as not to allow the installation of additional applications or may only allow preapproved applications to be installed).

In various embodiments, a driver computing device 108 may be integrated within and/or communicate with a self-driven vehicle (e.g., a vehicle that has the capability of driving without physical steering guidance from a human being) and may influence the movement of the vehicle by providing route information (e.g., passenger pick-up and destination locations driver destination locations, navigational directions, etc.) to the self-driven vehicle. Accordingly, as used herein "driver" may refer to a human being that may physically drive or otherwise control movement of a vehicle or to the vehicle itself (e.g., in the case of a self-driven vehicle) or component thereof (e.g., computing device application 108 or logic thereof).

In particular embodiments, a passenger application runs on passenger computing devices 104. The application may allow a user to enter various account information (e.g., in connection with a registration with the transportation service) to be utilized by a transportation service. For example, the account information may include a user name and password (or other login credentials), contact information of the user (e.g., phone number, home address), payment information (e.g., credit card numbers or bank account numbers and associated information), car preference information (e.g., what models or color of car the user prefers), or other account information.

The application may allow a user to request a ride from the transportation service. In various embodiments, the application may establish a pick-up location automatically or based on user input (e.g., locations may include the current location of the computing device 104 as determined by a global positioning system (GPS) of the computing device or a different user-specified location). In certain embodiments, the user may specify a destination location as well. The locations may be specified in any suitable format, such as GPS coordinates, street address, establishment name (e.g., LaGuardia Airport, Central Park, etc.), or other suitable format. At any time (e.g., before the ride, during the ride, or after the ride is complete) the user may specify a method of payment to be used for the ride. The user may also specify whether the request is for immediate pick-up or for a specified time in the future. In various embodiments, the user may specify pick-up by a vehicle that has particular merchandise available for use by the user, such as a specified type of battery charger, bottle of water or other food or beverage, umbrella, or other suitable merchandise. The user may also specify criteria for the driver, such as a minimum performance rating, such that drivers having performance ratings below the minimum performance rating will not be considered during selection of the driver.

The user may use the application to order a ride based on the specified information. The request for the ride is generated based on the information and transmitted to backend system 116. Backend system 116 will facilitate the selection of a driver. In some embodiments, backend system 116 may select a driver based on any suitable factors, such as the information contained in the request from the passenger, the proximity of the driver to the passenger, or other suitable factors. In other embodiments, backend system 116 may select a plurality of drivers that could fulfill the ride request, send information associated with the drivers to the passenger, and allow the passenger to select the driver to be used via the application on the passenger computing device 104. Any suitable information about the potential driver(s) may be sent to the computing device 104 either before or after the selection of the driver by the passenger, such as a location of a driver, an estimated pick-up time, a type of car used by a driver, the merchandise available in the car, driver ratings or comments from other passengers about the driver, or other suitable information.

Once a driver has been selected and has accepted the request to provide a ride, the application may notify the user of the selected driver and provide real-time updates of the driver's location (e.g., with respect to the passenger's location) and estimated pick-up time. The application may also provide contact information for the driver and/or the ability to contact the driver through the application (e.g., via a phone call or text). Once the ride has begun, the application may display any suitable information, such as the current location of the computing device 104 and the route to be taken. Upon completion of the ride, the application may provide the passenger the ability to rate the driver or provide comments about the driver.

In particular embodiments, a driver application runs on driver computing devices 108. The application may allow a driver to enter various account information to be utilized by a transportation service. For example, the account information may include a user name and password (or other login credentials), contact information of the driver (e.g., phone number, home address), information used to collect payment (e.g., bank account information), vehicle information (e.g., what model or color of car the driver utilizes), merchandise offered by the driver, or other suitable information.

In various embodiments, the application may allow a driver to specify his availability to transport passengers for the transportation service. In some embodiments, the driver may select between multiple levels of availability. In one example, the driver may be "available," meaning that the driver is willing to receive and consider any transportation requests that the transportation service sends the driver; the driver may be "unavailable," meaning that the driver is not willing to receive any transportation requests (e.g., this state may be explicitly indicated by the driver inputting this state into his computing device or may be detected through a deduction that the driver's computing device is not logged in to the transportation service through the driver application), or the driver may be "inactive," meaning that the driver only desires to receive particular requests meeting certain exception criteria specified by the driver.

The application may periodically transmit the current location of the computing device 108 as determined by a GPS of the computing device 108 to the backend system 116. When a driver is selected to provide (or is identified as a suitable candidate for) a ride, backend system 116 may send a notification to the driver application. In some embodiments, the driver may have a limited amount of time to select whether the driver accepts the ride. In other embodiments, the application may be configured by the driver to automatically accept the ride or to automatically accept the ride if certain criteria are met (e.g., fare minimum, direction of travel, minimum passenger rating, etc.).

Once a pairing of the driver and the passenger is confirmed by backend system 116, the application may navigate the driver to the passenger. The application may also provide contact information for the passenger and/or the ability to contact the passenger through the application (e.g., via a phone call, email, instant message, or text). The application may also navigate the driver to the passenger's destination once the ride begins. Upon completion of the ride, the application may provide the driver the ability to rate the passenger or provide comments about the passenger.

System 100 may include one or more application servers 112 coupled to the computing devices through one or more networks 120. The passenger application and driver application may be supported with, downloaded from, served by, or otherwise provided through an application server 112 or other suitable means. In some instances, the applications can be downloaded from an application storefront onto a particular computing device using storefronts such as Google Android Market, Apple App Store, Palm Software Store and App Catalog, RIM App World, etc., or other sources. In various embodiments, the passenger application and driver application may be installed on their respective devices in any suitable manner and at any suitable time. As one example, a passenger application may be installed on a computing device as part of a suite of applications that are pre-installed prior to provision of the computing device to a consumer. As another example, a driver application may be installed on a computing device by a transportation service (or an entity that provisions computing devices for the transportation service) prior to the issuance of the device to a driver that is employed or otherwise associated with the transportation service.

As described above, applications utilized by computing devices 104 and 108 can make use of a backend system 116. Backend system 116 may comprise any suitable servers or other computing devices that facilitate the provision of a transportation service as described herein. For example, backend system 116 may receive a request from a passenger and facilitate the assignment of a driver to fulfill the request. Backend system 116 is described in more detail in connection with FIG. 3.

In general, servers and other computing devices of backend system 116 or application server 112 may include electronic computing devices operable to receive, transmit, process, store, or manage data and information associated with system 100. As used in this document, the term "computing device," is intended to encompass any suitable processing device. For example, portions of backend system 116 or application server 112 may be implemented using computers other than servers, including server pools. Further, any, all, or some of the computing devices may be adapted to execute any operating system, including Linux, UNIX, Windows Server, etc., as well as virtual machines adapted to virtualize execution of a particular operating system, including customized and proprietary operating systems.

Further, servers and other computing devices of system 100 can each include one or more processors, computer-readable memory, and one or more interfaces, among other features and hardware. Servers can include any suitable software component or module, or computing device(s) capable of hosting and/or serving a software application or services (e.g., services of application server 112 or backend system 116), including distributed, enterprise, or cloud-based software applications, data, and services. For instance, servers can be configured to host, serve, or otherwise manage data sets, or applications interfacing, coordinating with, or dependent on or used by other services, including transportation service applications and software tools. In some instances, a server, system, subsystem, or computing device can be implemented as some combination of devices that can be hosted on a common computing system, server, server pool, or cloud computing environment and share computing resources, including shared memory, processors, and interfaces.

In various embodiments, backend system 116 or any components thereof may be deployed using a cloud service such as Amazon Web Services, Microsoft Azure, or Google Cloud Platform. For example, the functionality of the backend system 116 may be provided by virtual machine servers that are deployed for the purpose of providing such functionality or may be provided by a service that runs on an existing platform.

System 100 also includes various networks 120 used to communicate data between the computing devices 104 and 108, the backend system 116, and the application server 112. The networks 120 described herein may be any suitable network or combination of one or more networks operating using one or more suitable networking protocols. A network may represent a series of points, nodes, or network elements and interconnected communication paths for receiving and transmitting packets of information. For example, a network may include one or more routers, switches, firewalls, security appliances, antivirus servers, or other useful network elements. A network may provide a communicative interface between sources and/or hosts, and may comprise any public or private network, such as a local area network (LAN), wireless local area network (WLAN), metropolitan area network (MAN), Intranet, Extranet, Internet, wide area network (WAN), virtual private network (VPN), cellular network (implementing GSM, COMA, 3G, 4G, LTE, etc.), or any other appropriate architecture or system that facilitates communications in a network environment depending on the network topology. A network can comprise any number of hardware or software elements coupled to (and in communication with) each other through a communications medium. In some embodiments, a network may simply comprise a transmission medium such as a cable (e.g., an Ethernet cable), air, or other transmission medium.

Figure 2:
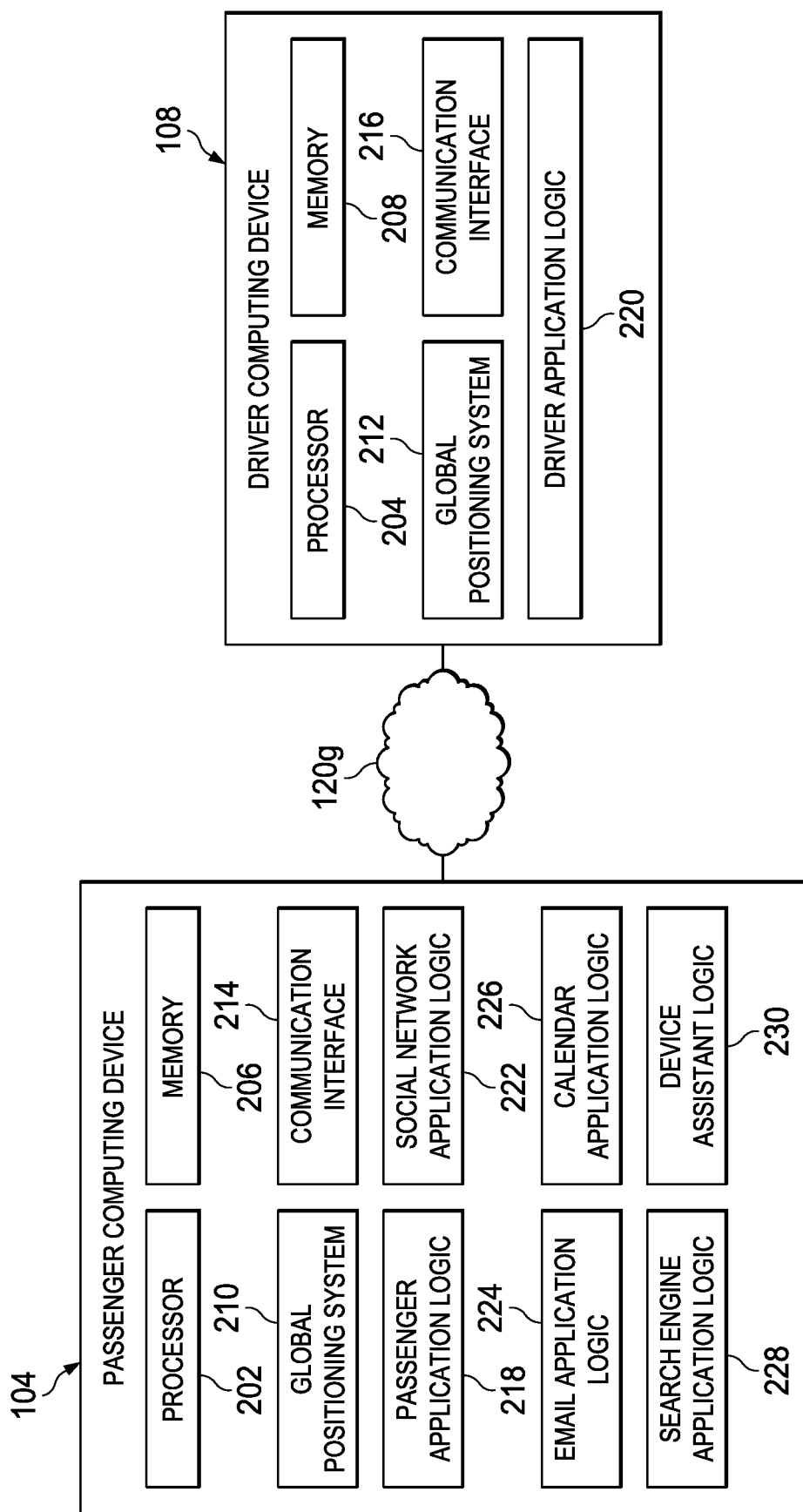
FIG. 2 illustrates a block diagram of a passenger computing device and a driver computing device of the system of FIG. 1 in accordance with certain embodiments.

FIG. 2 illustrates a block diagram of a passenger computing device 104 and a driver computing device 108 of the system of FIG. 1 in accordance with certain embodiments. Herein, "passenger computing device" may be used to refer to a computing device used by a subscriber or other user who interacts with the transportation service (e.g., by communicating with the transportation service to request transportation) while "driver computing device" may be used to refer to a computing device used by a driver of the transportation service. A subscriber may refer to an individual or entity that has provided account data (e.g., user name, password, payment information, telephone number, home address, other account information, or any suitable combination thereof) to backend system 116 for storage by the backend system 116. In the embodiment shown, the devices may be communicatively coupled through network 120g which may include any suitable intermediary nodes, such as a backend system 116.

In the embodiment depicted, computing devices 104 and 108 each include a computer system to facilitate performance of their respective operations. In particular embodiments, a computer system may include a processor, storage, and one or more communication interfaces, among other components. As an example, computing devices 104 and 108 each include one or more processors 202 and 204, memory elements 206 and 208, and communication interfaces 214 and 216, among other hardware and software. These components may work together in order to provide functionality described herein.

A processors 202 or 204 may be a microprocessor, controller, or any other suitable computing device, resource, or combination of hardware, stored software and/or encoded logic operable to provide, either alone or in conjunction with other components of computing devices 104 and 108, the functionality of these computing devices. In particular embodiments, computing devices 104 and 108 may utilize multiple processors to perform the functions described herein.

A processor can execute any type of instructions to achieve the operations detailed in this Specification. In one example, the processor could transform an element or an article (e.g., data) from one state or thing to another state or thing. In another example, the activities outlined herein may be implemented with fixed logic or programmable logic (e.g., software/computer instructions executed by the processor) and the elements identified herein could be some type of a programmable processor, programmable digital logic (e.g., a field programmable gate array (FPGA), an erasable programmable read only memory (EPROM), an electrically erasable programmable ROM (EEPROM)) or an application specific integrated circuit (ASIC) that includes digital logic, software, code, electronic instructions, or any suitable combination thereof.

Memory 206 and 208 may comprise any form of non-volatile or volatile memory including, without limitation, random access memory (RAM), read-only memory (ROM), magnetic media (e.g., one or more disk or tape drives), optical media, solid state memory (e.g., flash memory), removable media, or any other suitable local or remote memory component or components. Memory 206 and 208 may store any suitable data or information utilized by computing devices 104 and 108, including software embedded in a computer readable medium, and/or encoded logic incorporated in hardware or otherwise stored (e.g., firmware). Memory 206 and 208 may also store the results and/or intermediate results of the various calculations and determinations performed by processors 202 and 204.

Communication interfaces 214 and 216 may be used for the communication of signaling and/or data between computing devices 104 and 108 and one or more networks (e.g., 120g) and/or network nodes (e.g., backend system 116 and application server 112) coupled to a network or other communication channel. For example, communication interfaces 214 and 216 may be used to send and receive network traffic such as data packets. Each communication interface 214 and 216 may send and receive data and/or signals according to a distinct standard such as an LTE, IEEE 802.11, IEEE 802.3, or other suitable standard. In various embodiments, any of the data described herein as being communicated between elements of system 100 may be data generated using voice commands from a user or data generated independently of voice commands (e.g., data may be generated by a processor in response to the processor receiving data from another element or from an input device such as a touch screen). Communication interfaces 214 and 216 may include antennae and other hardware for transmitting and receiving radio signals to and from other devices in connection with a wireless communication session over one or more networks 120.

GPS units 210 and 212 may include any suitable hardware and/or software for detecting a location of their respective computing devices 104 and 108. For example, a GPS unit may comprise a system that receives information from GPS satellites, wireless or cellular base stations, and/or other suitable source and calculates a location based on this information (or receives a calculated position from a remote source). In one embodiment, the GPS unit is embodied in a GPS chip.

Passenger application logic 218 may include logic providing, at least in part, the functionality of the passenger application described herein. Similarly, driver application logic 220 may include logic providing, at least in part, the functionality of the driver application described herein. In a particular embodiment, the logic of devices 104 and 108 may include software that is executed by processor 202 and 204. However, "logic" as used in this Specification, may include but not be limited to hardware, firmware, software and/or combinations of each to perform a function(s) or an action(s), and/or to cause a function or action from another logic, method, and/or system. In various embodiments, logic may include a software controlled microprocessor, discrete logic (e.g., an application specific integrated circuit (ASIC)), a programmed logic device (e.g., a field programmable gate array (FPGA)), a memory device containing instructions, combinations of logic devices, or the like. Logic may include one or more gates, combinations of gates, or other circuit components. Logic may also be fully embodied as software.

In various embodiments of the present disclosure, in addition to any combination of the features described above with respect to the passenger application, application logic 218 may provide additional features for the passenger application to enhance a passenger's experience with the transportation service.

In various embodiments, passenger application logic 218 may enable an interface for the passenger to view and interact with information associated with routes including segments serviced by multiple transportation services. In a particular embodiment, passenger application logic 218 may allow the passenger to indicate a willingness to consider routes that are serviced by multiple transportation services. The passenger may also use passenger application logic 218 to submit transportation requests for such routes.

Passenger application logic 218 may also provide functionality enabling the passenger to specify one or more constraints (to be discussed in more detail below) that should be applied by the backend system 116 when determining which routes may be preferable to the passenger. Passenger application logic 218 may also allow the passenger to view one or more routes from a pickup location specified by the passenger to a destination location specified by the passenger and select a route for a transportation request. Passenger application logic 218 may provide additional functionality described below in connection with the backend system.

In a particular embodiment, a user may supply login credentials for a social network system (e.g., FACEBOOK) or other social media system (e.g., TWITTER) to the transportation service through passenger application logic 218. The transportation service (e.g., through backend server) may then access the user's account on the social network system or other social media system and access information associated with the user's account. As another example, passenger application logic 218 may access the user's social media account directly and integrate information from the account with other functionality of the passenger application logic.

Social network application logic 222 may provide a user interface to allow a passenger to interact with (e.g., enter and transmit information to and view information received from) a social network system. A social network system may store a record (i.e., a user profile) for each user of the system. The user profile may include any suitable information about the user, such as contact information, employment information, demographic information, personal interests, user-generated content, or other suitable information. The social network system may also store a record of the user's relationship with other users of the social network system. For example, such information may be stored as a social graph, wherein users (e.g., individuals, groups, business entities, organizations, etc.) may be represented as nodes in the graph and the nodes may be connected based on relationships between the users. A social network system may provide various services (e.g., photo sharing, wall posts, messaging, games, or advertisements) facilitating interaction between the users.

In various embodiments, the social network system may interact with passenger application logic 218 or backend system 116 to enhance the functionality of these components. As an example, background information associated with a passenger may be obtained by a backend system 116 and used to determine whether to route a request from the passenger to a particular driver.

In various embodiments, the social network system may provide any of the functionality listed above with respect to passenger application logic 218 in allowing a user to request a ride and may relay received requests for rides to backend system 116 along with any suitable identifying information about the user to facilitate pickup by a driver.

Email application logic 224 may provide an interface for the passenger to read, draft, and/or manage emails. Email application logic 224 may comprise a traditional email client (e.g., Microsoft Outlook or a native iOS or Android mail application) or a web-based email application (e.g., a web browser or other application operable to access Outlook.com, Gmail, Yahoo! Mail, or other web-based email service).

Calendar application logic 226 may provide an interface for the passenger to read, draft, and/or manage calendar appointments and related tasks. Calendar application logic 226 may comprise a traditional calendar client (e.g., Microsoft Outlook or a native iOS or Android calendar application) or a web-based calendar application (e.g., a web browser or other application operable to access Outlook.com, Google Calendar, or other web-based calendar service).

Search engine application logic 228 may provide an interface for the passenger to perform Internet keyword searches. In various embodiments, logic 228 is operable to receive input forming a keyword search. In some embodiments, logic 228 may also perform the keyword search by transmitting the search to one or more servers operable to perform the search and provide search results back to logic 228. In other embodiments, logic 228 may communicate the input to another application to perform the keyword search. In various embodiments, logic 228 may present the search results to the passenger via any suitable interface (e.g., a visual or audio interface). In various embodiments, logic 228 may comprise a web browser or other application.

Device assistant logic 230 may comprise logic to enhance the functionality of other applications of passenger computing device 104. In particular embodiments, device assistant logic 230 may comprise an intelligent personal assistant, such as Siri, Cortana, Google Now, or similar assistant. In various embodiment, device assistant logic 230 may monitor activity of the passenger computing device 104, including an operating system or one or more applications of passenger computing device 104. For example, device assistant logic 230 may access emails, instant messages, or text messages sent by, received by, or accessible by email application logic 224 or other logic of passenger computing device 104. As another example, device assistant logic 224 may access calendar appointments available through calendar application logic 226 (which may be stored in a calendar file stored by passenger computing device 104 or on a remote server). As another example, device assistant logic 224 may access search queries made through search engine application logic 228. As another example, device assistant logic 224 may access transportation requests made through passenger application logic 218 or detect when passenger application logic 218 is opened. As another example, device assistant logic 230 may access the location of passenger computing device 104 using data determined by global positioning system 210.

In various embodiments, device assistant logic 230 may enhance the user experience of the passenger by answering questions from the passenger, making recommendations to the passenger, and performing other actions, such as drafting emails, texts, or calendar appointments. In addition to answering questions explicitly asked by the passenger, device assistant logic 230 may proactively obtain information and present the information to the passenger. In various embodiments, the proactive presentation of information is based upon previous user activity with respect to passenger computing device 104. For example, device assistant logic 230 may present or direct the presentation of (e.g., within a web browser) the status of a flight reservation or other travel reservation that the passenger booked or accessed using a web browser of the passenger computing device 104 or for which a confirmation email was received via email application logic 224. As other examples, device assistant logic 230 may direct the presentation of hotel or restaurant reservations, weather information, sporting event information, package tracking information, local movie times, stock prices, news events, or other information based on the passenger's location, emails, calendar appointments, search or browsing history, or other activity.

Device assistant logic 230 may also use information obtained from the operating system or applications of passenger computing device 104 to enhance the user experience of the passenger with respect to the transportation service. For example, information obtained by the device assistant logic 230 may be used to predict whether the passenger will submit a transportation request to the transportation service and the backend system 116 may proactively send drivers closer to passengers that are likely to submit transportation requests. In various embodiments, device assistant logic 230 may communicate device activity data (which may include at least a subset of the gathered information or other information obtained by processing at least a subset of the gathered information) directly to a server of backend system 116 controlled by the transportation service. In other embodiments, device assistant logic 230 may communicate activity information to a third party server controlled by, for example, the provider of the device assistant logic (e.g., Google, Apple, Microsoft, etc.), which may then communicate the device activity data (or a subset thereof) to a server of backend system 116 controlled by the transportation service. In yet other embodiments, device assistant logic 230 may communicate device activity data with passenger application logic 218 which may then communicate device activity data (or a subset thereof) to the backend system 116.

Figure 3:
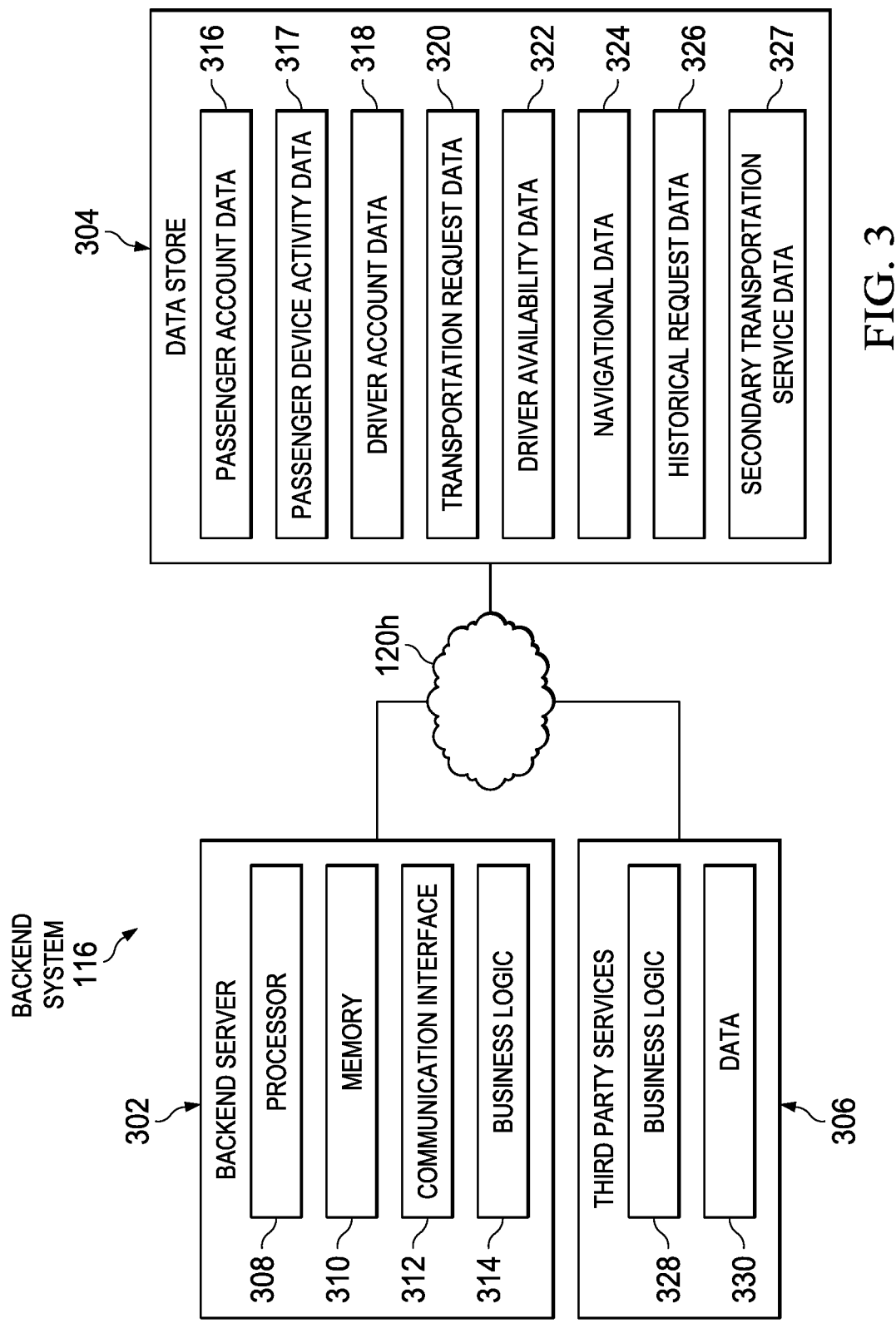
FIG. 3 illustrates a block diagram of a backend system of the system of FIG. 1 in accordance with certain embodiments.

FIG. 3 illustrates a block diagram of a backend system 116 of the system of FIG. 1 in accordance with certain embodiments. Although FIG. 3 depicts a particular implementation of the backend system 116, the backend system may include any suitable devices to facilitate the operation of the transportation service described herein. In the embodiment depicted, backend system includes backend server 302, data store 304, and third party services 306 coupled together by network 120h. In various embodiments, backend server 302, data store 304, and/or third party services 306 may each comprise one or more physical devices (e.g., servers or other computing devices) providing the functionality described herein. In some embodiments, one or more of backend server 302, data store 304, and third party services 306 (or portions thereof) are deployed using a cloud service and may comprise one or more virtual machines or containers. In a particular embodiment, backend server 302 and data store 304 are controlled by the transportation service, while third party services 306 are controlled by a third party entity.

In the embodiment depicted, backend server 302 includes a computer system to facilitate performance of its operations. As an example, backend server 302 includes one or more processors 308, memory elements 310, and communication interfaces 312, among other hardware and software. These components may work together in order to provide backend server functionality described herein. Processor 308 may have any suitable characteristics of the processors 202 and 204 described above. In particular embodiments, backend server 302 may utilize multiple processors to perform the functions described herein. In various embodiments, reference to a processor may refer to multiple discrete processors communicatively coupled together.

Similarly, memory 310 may have any suitable characteristics of memories 206 and 208 described above. Memory 310 may store any suitable data or information utilized by backend server 302, including software embedded in a computer readable medium, and/or encoded logic incorporated in hardware or otherwise stored (e.g., firmware). Memory 310 may also store the results and/or intermediate results of the various calculations and determinations performed by processor 308.

Communication interface 312 may also have any suitable characteristics of communication interfaces 214 and 216 described above. Communication interfaces 312 may be used for the communication of signaling and/or data between backend server 302 and one or more networks (e.g., networks 120) and/or network nodes (e.g., computing devices 104 and 108, data store 304, third party services 306, and application server 112) coupled to a network or other communication channel.

Business logic 314 may have any suitable characteristics of application logic 218 and 220 described above. Business logic 314 may include logic providing, at least in part, the functionality of the backend server described herein. In a particular embodiment, business logic 314 may include software that is executed by processor 308. However, in other embodiments, business logic 314 may take other forms such as those described above with respect to application logic 218 and 220.

Backend server 302 may communicate with data store 304 to initiate storage and retrieval of data related to the transportation service. Data store 304, may store any suitable data associated with the transportation service in any suitable format(s). For example, data store 304 may include one or more database management systems (DBMS), such as SQL Server, Oracle, Sybase, IBM DB2, or NoSQL data bases (e.g., Redis and MongoDB). Data store 304 may be located on one or more computing devices that are distinct from backend server 302 or on the same device as at least a portion of backend server 302. Any of the information stored by data store 304 could additionally or alternatively be stored locally in memory 310 temporarily or persistently.

In the embodiment depicted, data store 304 includes passenger account data 316, passenger device activity data 317, driver account data 318, transportation request data 320, driver availability data 322, navigational data 324, historical request data 326, and secondary transportation service data 327. The various data may be updated at any suitable intervals.

Passenger account data 316 may include any suitable information associated with accounts of subscribers to the transportation service, such as contact information (e.g., real names and addresses), user names and passwords (or other authentication information), payment information (e.g., credit card or bank account numbers and associated information), passenger preferences (e.g., preferred type or color of car), ratings the passenger has given drivers, ratings the passenger has received from drivers, or other information associated with passenger profiles. In particular embodiments, passenger account data 316 of a passenger may include a record of one or more constraints to be used in selecting routes for the passenger.

Passenger device activity data 317 may comprise activity information received from passenger computing devices 104 (e.g., via passenger application logic 218, device assistant logic 230, or from a third party service), such as search queries, browsing history, calendar appointments, emails, text messages, instant messages, location data, other activity information, and/or information derived therefrom. Such activity information may include a record of the commute times and locations of the passenger (e.g., as obtained from GPS 210 of the device); flight reservations, train reservations, or other transportation reservations made or used by the passenger; calendar appointments or other written communications (e.g., emails, text messages, instant messages) specifying travel or meetings requiring travel by the passenger; web searches for local points of interest; or other suitable activity data. For any suitable activity data, passenger device activity data 317 may also comprise indications of whether particular activity data resulted in the generation of a transportation request and if so, the particular details of the transportation request or a link to the transportation request in historical request data 326 (to be explained in further detail below). In various embodiments, passenger device activity data 317 may also comprise statistics correlating particular activity data of passengers with transportation requests made by the passengers. For example, passenger device activity data 317 may include statistics indicating how likely one or more particular types of activity data are to result in the generation of a transportation request by the passenger. As another example, passenger device activity data 317 may include statistics indicating when the user is most likely to generate a transportation request in connection with one or more particular activities. In some embodiments, passenger device activity data 317 may include a series of likelihoods that the passenger will generate a request as a function of time (e.g., around a time specified by the activity data, such as a flight time or a commute start time).

Driver account data 318 may include any suitable information associated with driver accounts, such as contact information (e.g., real names and addresses), user names and passwords (or other authentication information), payment collection information (e.g., bank account information), vehicle information (e.g., models and colors of cars the drivers utilize, maximum capacity of the cars of the drivers), merchandise offered by the drivers, whether the drivers are available to transport passengers, whether the drivers have opted for automatic acceptance of transportation requests (whereby the backend server 302 may assign a transportation request to the driver without waiting for the driver to indicate acceptance of a request), or other suitable information.

Transportation request data 320 may comprise pending requests (i.e., requests that have not yet been fulfilled) received from passengers. Each request may include any suitable information, such as any combination of one or more of an identification of the passenger making the request, the time the request was made, the current location of the passenger, the desired pick-up location, the desired pick-up time, the estimated time remaining until a driver can pick up the passenger, the actual pick-up time, the desired destination location of the passenger (which the passenger may or may not provide at the time the request is made), the expected arrival time at the destination location, the type of vehicle requested, estimated fare for the trip, current accumulated fare for the trip, estimated time and mileage remaining in the trip, other information specified by the user (e.g., requested merchandise, requested minimum rating of driver), whether a driver has been assigned to a request, and which driver has been assigned to a request.

Driver availability data 322 may comprise information associated with drivers that are available to transport passengers. In some embodiments, driver availability data 322 may also comprise information associated with drivers that are not available to transport passengers (e.g., because they are off-duty or currently transporting a passenger). An entry in the driver availability data 322 may include an identification of a driver and any suitable associated information, such as one or more of a current location of the driver, whether the driver is available to transport passengers, whether the driver is currently transporting a passenger, a destination location of a current trip of the driver, an estimate of how long it will be before the driver finishes his current trip, whether the driver has opted for automatic acceptance of transportation requests, or other suitable information.

Navigational data 324 may comprise information supporting navigation functions provided by the passenger applications and driver passenger applications. For example, navigational data 324 may comprise map data that may be sent to passenger computing devices 104 and driver computing devices 108 to allow the devices to display maps and associated indicators (e.g., location of passenger(s), location of driver(s), desired routes, etc.). In some embodiments, the navigational data may also comprise information indicative of the amount of time required to travel between various locations. In some embodiments, navigational data 324 may comprise historic and/or real time data about the flow of traffic in particular areas enabling backend server 302 to calculate an estimated time required to travel from one location to another.

Historical request data 326 may comprise information about completed requests. In some embodiments, historical request data 326 may also include information about canceled requests. The information for each request may include any combination of the information listed above with respect to requests stored in the transportation request data 320 as well as any combination of additional data such as the time at which the destination location was reached, the total time of the trip, the total fare, a rating given by the passenger to the driver or by the driver to the passenger for the trip, or other suitable information associated with the trip.

Secondary transportation service data 327 may include information obtained from computing devices of one or more transportation services. In particular embodiments, secondary transportation service data 327 may be obtained by connecting to a computing device of another transportation device, such as a server hosting a webpage or other file containing secondary transportation service information, a server providing an API through which backend server 302 may request secondary transport service information from the server, or one or more other computing devices storing secondary transportation service information. Secondary transportation service data 327 may include any suitable information, such as locations of terminals of other transport services, indications of types of transport vehicles used by the other transport services, indications of particular transport vehicles used by the other transport services, schedules for particular transport vehicles used by the other transport services (e.g., the schedules may indicate the times at which a particular transportation vehicle is scheduled to stop at any number of terminals), reliability and/or punctuality information associated with particular transport vehicles, prices for traveling on the transportation vehicles of the other transport services, ticket availability for particular vehicles, walking distances between automobile drop off points and locations at the terminals at which vehicles can be boarded, current locations of particular transport vehicles (e.g., as measured by GPS) or other suitable information associated with the other transport services.

In various embodiments, backend server 302 may access third party services 306 through business logic 328 to access data 330. Third party services 306 may represent any suitable number of devices operated by any suitable number of third parties that are distinct from an entity that operates the backend system 116 and/or data store 304. For example, in some embodiments the navigational data may be obtained from a third party service 306 rather than data store 304, or additional third party navigational data such as map data or historical and/or current traffic flow information may be used to supplement navigational data 324. As another example, third party services 306 may authenticate users on behalf of the backend server 302 (e.g., through an account of the user with the third party). Business logic 328 may comprise any suitable logic operable to receive requests for data from backend system 116 and/or computing devices 104 and 108 and provide responses to the requests.

Backend server 302 may be in communication with each passenger computing device 104 and each driver computing device 108 that is utilizing the transportation service at a particular time. Backend server may store information received from the computing devices 104 and 108 in data store 304. Backend server 302 may also receive and respond to requests made by computing devices 104 and 108 by processing information retrieved from data store 304.

When a passenger opens the passenger application, the backend server 302 may log the passenger in based on a comparison of authentication information provided by the passenger computing device 104 with authentication information stored in passenger account data 316. The passenger may then request a ride. The request is received by the backend server 302 and stored in transportation request data 320. Backend server 302 may access driver availability data 322 to determine one or more drivers that would be suitable to fulfill the request from the passenger. In one embodiment, backend server 302 selects a particular driver (e.g., based on the driver's locality with respect to the passenger's pick-up location) and sends information associated with the request to the driver. The driver indicates whether he accepts or rejects the request via his computing device 108. If the driver rejects the request, backend server 302 selects a different driver and the process is repeated until the backend server 302 receives an accepted request from a driver. In another embodiment, backend server 302 may select a plurality of drivers that may fulfill a transportation request and allow the passenger to select one of the drivers. The backend server 302 may proceed to notify the driver of the request in a similar manner to that described above. In yet another embodiment, backend server 302 may select a plurality of drivers that may fulfill a transportation request and notify each driver of the transportation request. The backend server 302 may then allocate the request to one of the drivers based on any suitable criteria. For example, the driver who is the first to accept the request may be assigned to the request. As another example, if multiple drivers accept the request within a given timeframe, the request may be assigned to the most suitable driver (e.g., the driver that is closest to the pick-up location or a driver that has a car that meets preferred characteristics of the transportation request).

Once the request has been accepted by a driver, the backend server 302 notifies the passenger that a driver has accepted his request and provides any suitable information associated with the driver (e.g., driver's current location, model and color of vehicle, estimated time of arrival, etc.) to the passenger.

The backend server 302 may provide navigation information (e.g., the passenger's current location or other pickup location and directions to the current location or other pickup location) to the driver computing device 108 to direct the driver to the passenger's pickup location and subsequently to direct the driver to the passenger's destination location. The backend server 302 may also provide real-time updates associated with the trip to both the passenger and the driver.

Once the passenger's destination location has been reached, the backend server 302 may facilitate payment of the fare for the trip using payment information stored in passenger account data 316 and/or driver account data 318 (or information supplied by the passenger at the time of the transaction). The backend server 302 may also receive ratings associated with the trip for the passenger and driver and store these ratings in data store 304.

In various embodiments, backend server 302 may create routes from a pickup location to a destination location that include segments from multiple different transportation services, including the transportation service that controls backend server 302. Hereinafter, the transportation service that controls backend server 302 to navigate drivers to passengers is referred to as a primary transportation service while other transportation services that may service segments of the routes are referred to as secondary transportation services.

In a particular embodiment, the primary transportation service facilitates the transportation of passengers using a type of transportation vehicle that is different from a type of transportation vehicle used by a secondary transportation service to transport passengers. Any suitable types of transportation vehicles may be used by any of the transportation services. In one embodiment, the primary transportation service uses cars to transport passengers. The term "cars" may encompass automobiles such as coupes, hatchbacks, station wagons, sedans, convertibles, crossovers, sport utility vehicles, minivans, suburbans, passenger vans, pickup trucks, or other small automobiles. In various embodiments, the secondary transportation service may use other types of transportation vehicles to transport passengers, such as buses, trains (e.g., above ground or subway), airplanes, helicopters, boats, or other land, air, or water vehicles. In various embodiments, each secondary transportation service is controlled by an entity that is distinct from an entity that controls the primary transportation service. In some embodiments, a secondary transportation service may be a public transportation service controlled by a public entity, such as a city government or other governmental entity. In general, a public transportation service allows anyone buying a ticket to ride transportation vehicles controlled by the public transportation service without requiring the passenger to create an account with the public transportation service (though in some cases the passenger may create an account for ease of use). In some embodiments, a secondary transportation service may have a plurality of terminals (e.g., ports, airports, bus stops, train stops, etc.) at which transport vehicles of the secondary transportation service stop to drop off and/or pick up passengers. Some terminals may also have machines which accept payment for the fare required to ride a transportation vehicle and dispense tickets, add money to a card, or otherwise authorize the passenger for a ride on the transportation vehicle associated with the secondary service.

Backend server 302 may generate routes each having any suitable number of segments that may be serviced by any number of the transportation services. In general, the primary transportation service sends a driver to service at least one of the segments in each route. As just one example, a route may consist of three segments: 1) a segment from the passenger's home to a first terminal (such as a bus stop or subway terminal) associated with a secondary transportation service (this segment may be serviced by a first driver of the primary transportation service), 2) a segment from the first terminal to a second terminal of the secondary transportation service (this segment may be serviced by the secondary transportation service), and 3) a segment from the second terminal to the passenger's workplace (this segment may be serviced by a second driver of the primary transportation service). Any segment may be serviced by any of the transportation services. Alternatively, a segment may be traveled by the passenger using alternate means of transportation, such as walking or riding a bicycle, moped, motorcycle, or other means of transportation. The segments of a route may be serviced by the transportation services in any suitable order. For example, the primary transportation service may service the first segment of a route and a secondary transportation service may service the second segment of a route or vice versa.

In various embodiments, backend server 302 may receive a transportation request from a passenger that includes an indication that the passenger desires (or at least is willing to consider) a route that includes segments serviced by multiple different transportation services. In other embodiments, the indication may be sent in a separate communication.

In some embodiments, the indication may be sent to the backend server 302 by the passenger prior to the sending of the transportation request. For example, the passenger may request to see possible routes between a specified pickup location and a destination location prior to selecting a route and submitting a transportation request. In another example, the passenger may indicate in a setting associated with the passenger's account that the passenger is willing to use routes having segments served by multiple transportation services. As yet another example, backend server 302 may infer based on previous transportation requests utilizing routes having segments served by multiple transportation services, that the user is willing to view such routes in associated with future transportation requests.

In some embodiments, the indication is sent by the passenger to the backend server 302 after the transportation request is sent to the backend server. For example, an initial transportation request specifying a pickup location and a destination location for service from the primary transportation service may be sent to the backend server 302 and the backend server 302 may respond with a query as to whether the passenger would like to consider a route having segments serviced by multiple transportation services. In some embodiments, the backend server may send a similar query after the ride has begun. For example, the backend server 302 may detect (e.g., based on information in the transportation request or through device activity data of the user) that the driver will not be able to make it to an event (which may be detected from the device activity data of the user) on time and may suggest a faster alternative route with a segment serviced by a secondary transportation service.

In some embodiments, the backend server 302 may generate a route with segments to be serviced by multiple transportation services and send the route to the passenger without receiving an explicit indication from the passenger that the passenger desires to consider such routes. For example, the backend server 302 may analyze previous transportation requests and/or device activity data of the passenger and determine that the passenger has traveled one or more routes that included segments from multiple transportation services. In such an instance, the passenger may have ordered one or more segments of a route from the primary transportation company, but did not select the entire route from the transportation company (e.g., the passenger may have determined the route on his own). From such a deduction, the backend server may infer that the passenger is amenable to receiving a suggestion of that particular route or more generally interested in routes having segments served by multiple transportation services and may generate and present such routes accordingly.

The backend server 302 may perform any suitable analysis to determine that the passenger traveled a route with one or more segments serviced by a secondary transportation service. For example, backend server 302 may compare pickup and destination locations of the transportation requests the passenger submitted to the backend server 302 with known locations of terminals of the secondary transportation services to determine whether the passenger had traveled to or from one of the terminals. Alternatively or in addition, if the backend server 302 or an associated server (e.g., a server controlled by a third party that sends the backend server 302 device activity data of passengers) has access to location data of the passenger computing device, the location data may be compared with known locations of the terminals and/or routes of particular transportation vehicles of the secondary transportation service to determine whether the passenger was at a particular terminal or rode a particular transportation vehicle (e.g., the 5:00 train or a bus on a particular route). Any suitable location data may be analyzed and used in determining whether the passenger traveled a segment using the secondary transportation service, such as GPS coordinates, travel speeds (e.g., travel speeds may be compared against travel speeds of transportation vehicles of one or more secondary services), time intervals in which location data is missing (e.g., missing data may indicate travel through areas with bad service, such as a tunnel), or other suitable location data. In determining whether the location data corresponds to usage of a secondary transportation service, any suitable information associated with the secondary transportation service may be accessed, such as terminal locations, travel schedules associated with one or more terminals and/or transportation vehicles of the secondary transportation service, actual or expected speeds of travel of transportation vehicles of the secondary transportation service, or other suitable information.

The backend server 302 may receive a transportation request specifying a pickup location and a destination location and associate the request with a route comprising segments serviced by the primary transportation service and at least one secondary transportation service. In various embodiments, the route may be included in the transportation request sent from a passenger to the backend server. For example, the passenger may specify a pickup location and destination location using passenger application logic 218. The backend server 302 may then send one or more routes to the passenger and passenger may select a route and submit the transportation request with the selected route to the backend server 302. As another example, backend server 302 may detect a high probability that the passenger will be submitting a transportation request in the near future (e.g., based on previous transportation requests submitted by the passenger and/or device activity data of the passenger) and may suggest one or more routes that each have segments to be serviced by the primary transportation service and at least one secondary transportation service. When the user accepts one of the routes, a transportation request may including the selected route may be generated and sent to backend server 302. In other embodiments, the route may be generated after the transportation request is sent to the backend server and may be associated with the transportation request at any suitable time, such as when the user accepts the route. For example, the passenger may submit a transportation request for a driver to transport the passenger from a pickup location to a destination location. The backend server 302 may respond with a suggestion for one or more routes having segments served by the primary transportation service and at least one secondary transportation service. The passenger may select a route and indicate the selection to the backend server 302, which then associates the route with the transportation request. As another example, a transportation request may be submitted and the passenger may be picked up before one or more routes having segments serviced by a secondary transportation service are generated (e.g., in response to an indication from the passenger or a determination that the passenger may benefit from such a route). In other embodiments, a route may be associated with a transportation request at any suitable time.

A passenger may be associated with one or more constraints that provide guidance for selecting routes for the passenger. In various embodiments, the passenger may explicitly specify the constraints, the constraints may be specified by default settings stored by passenger application logic 218, or the constraints may be default settings stored in passenger account data 316 accessible to the backend server in a profile of the passenger. In particular embodiments, one or more constraints may be inferred based on previous transportation requests and/or device activity data. For example, backend server 302 may determine from previous routes selected via the primary transportation service and/or taken without selecting via the primary transportation service, that the passenger has a preference for routes with minimum cost, minimum travel time, a certain type of transportation vehicle or an actual transportation vehicle (e.g., a train on the green line that departs a particular location at 8:00 AM), or any other suitable preference (such as other constraints listed below). As another example, backend server 302 may determine from device activity data that the passenger is scheduled to ride a vehicle associated with a secondary transportation service at a particular time (e.g., backend server 302 may detect a flight reservation of the passenger).

In various embodiments, one or more constraints may apply generally to any route presented to the passenger or one or more constraints may be specific to a particular transportation request and the prospective routes that are generated in connection with that transportation request.

Any suitable constraints may be specified. In various embodiments, one or more of the constraints may be absolute constraints. If a route does not match the applicable absolute constraints, the route is not presented to the passenger as a prospective route. Any suitable absolute constraint may be specified by the passenger and/or primary transportation service and applied to a route search to filter out non-desirable routes. In various embodiments, one or more of the constraints may be optimization constraints. An optimization constraint expresses a preference for one or more route characteristics and may be used to select and/or order routes.

One example of an absolute constraint is an explicit specification of a segment of the route to be used. For example, the constraint may specify information about a secondary transportation service that the passenger is to use for one or more segments of the route. For example, the constraint may specify, a particular transportation service, a particular vehicle of the transportation service (e.g., a bus on the 802 route, or a green line subway train), a pickup location at which the passenger desires to board the transportation vehicle, a time at which the passenger desires to board the transportation vehicle, a destination location at which the passenger desires to get off of the vehicle, a time at which the passenger desires to get off the vehicle, other suitable information associated with the secondary transportation service or its vehicle, or any combination thereof.

Other examples of absolute constraints include an arrival time associated with the destination location (e.g., a constraint that the route must deliver the passenger to the destination location at or before the arrival time), a maximum cost, a maximum amount of travel time, a minimum time per unit of cost value, a maximum amount of walking distance required by the route (e.g., a total maximum walking distance for the entire route or a maximum walking distance between intermediate locations of the route), a maximum number of transfers between transportation vehicles, and a maximum waiting time at transfers (e.g., at a particular transfer or in aggregate).

Examples of optimization constraints include preferences for a particular type of transportation vehicle (e.g., car, bus, train, etc.) or characteristic associated with the transportation vehicle, a particular transportation service, minimum cost, minimum travel time, minimum time/cost value, minimum walking distance, minimum number of transfers, and a minimum waiting time at transfers. In various embodiments, the optimization constraints may be ranked in order of importance and/or weighted. For example, minimum cost may be ranked as the most important and minimum travel time as the second most important optimization constraints. As another example, minimum cost may be given a weight of 8 on a scale of 1 to 10, while minimum travel time may be given a weight of 2.

The backend server 302 generates one or more routes based on a pickup location (which could be the current location of the passenger if the ride has already started) and destination location specified by a passenger (or inferred from previous transportation requests and/or device activity data). The routes may be presented to the passenger for selection of a route by the passenger or a route may be selected by the backend server 302. The selected route may be conveyed to the passenger and one or more drivers of the primary transportation service that are selected to service one or more segments of the selected route.

In particular embodiments, backend server 302 accesses one or more electronic data sources associated with one or more secondary transportation services to gather information to generate the routes. An electronic data source associated with a secondary transportation service may comprise a server hosting a webpage or other file containing secondary transportation service information, a server providing an API through which backend server 302 may request secondary transport service information from the server, or one or more other computing devices storing secondary transportation service information. In various embodiments, the electronic data source may be controlled (e.g., owned or maintained) by the secondary transportation service. In some embodiments, the electronic data source (e.g., backend server 302 or data store 304) may be controlled by the primary transportation service and comprise information obtained from one or more computing devices controlled by one or more secondary transportation services.

Any suitable secondary transportation service information may be stored by the electronic data source and used in the generation of the various routes. For example, the transportation service information may include locations of terminals of a secondary transport service, indications of types of transport vehicles used by the secondary transport service, indications of particular transport vehicles used by the secondary transport service, schedules for particular transport vehicles used by the secondary transport service (e.g., the schedules may indicate the times at which a particular transportation vehicle is scheduled to stop at any number of terminals), reliability and/or punctuality information associated with particular transport vehicles, prices for traveling on the transportation vehicles of the secondary transport service, ticket availability for particular vehicles, walking distances between automobile drop off points and locations at the terminals at which vehicles can be boarded, or other suitable information associated with the secondary transportation service.

In various embodiments, the one or more routes generated and/or selected are based on one or more absolute constraints and/or optimization constraints associated with the passenger and/or the particular transportation request. The constraints may be applied against various possible routes between the pickup location and the destination location to determine segments that may be serviced by the primary transportation company (optionally including selection of the specific driver(s)) and segments that should be serviced by a secondary transportation company (optionally including selection of the particular vehicles and/or terminals to be used). In applying the constraints against the possible routes, the backend server 302 may make use of any of the secondary transportation service information (e.g., secondary transportation service data 327 or externally stored secondary transportation service information) or any of the other information that backend server has available to it, such as transportation request data 320, driver availability data 322, navigational data 324, historical request data 326, or data regarding current traffic and/or weather conditions. Such data may enable backend server 302 to determine cost, travel times, waiting periods, or other characteristics associated with services that can be provided by the primary transportation service and one or more secondary transportation services in connection with the generated routes such that characteristics of the routes and segments thereof may be compared against and/or sorted by the constraints and ranks or weights associated with the constraints (if applicable).

In various embodiments, in response to a selection of a route or upon authorization from a passenger, backend server 302 may purchase a ticket for a transportation vehicle of a secondary transportation service on the passenger's behalf and make the ticket available to the passenger (e.g., by printing the ticket or sending information associated with the ticket to the passenger computing device 104). In alternative embodiments, passenger application logic 218 may interface with a ticket purchasing system of the secondary transportation service (directly or through backend server 302) thus allowing the passenger to purchase a ticket for a transportation vehicle of the secondary transportation service through application logic 218. In some embodiments, the passenger application logic 218 may (e.g., without requiring passenger input with respect to the secondary transportations service's ticketing interface) place a ticket for a segment of the route serviced by the secondary transportation service into a shopping cart of the passenger. In various embodiments, funds for the ticket are provided by the primary transportation service and the amount paid for the ticket is added on to a single bill for the route given to the passenger by the primary transportation service that also includes charges for any segments of the route serviced by the primary transportation service.

When one or more routes are presented to the passenger, any suitable information associated with the routes may be presented, such as an identification of which transportation service will be servicing the various segments, a pickup location and destination location of each segment, a cost of each segment, a total cost, an estimated travel time of each segment, an estimated total travel time, a time per unit cost of the route, an arrival time associated with the destination location of the route, a distance of each segment, a total distance, a required walking distance, any other information associated with the route or a segment thereof (e.g., any of the information described above which may be used in constraint), or any suitable combination thereof. The presentation of the routes may be presented to the passenger in an order based on the routes' conformity to the constraints (and ranking/ordering if provided).

In various embodiments if one or more absolute constraints cannot be met by any of the routes, the presentation of the routes may include a message stating such. Also, if a particular route does not meet one of the absolute constraints (or has a high likelihood that it will not meet one of the absolute constraints), then the route may be presented to the passenger along with a message with details associated with the constraint.

During the selection of routes, the backend server 302 may determine the degree of probability that a passenger may safely make a transfer from one transportation vehicle to another transportation vehicle and disregard routes that have an unacceptably high probability that the passenger will miss the connection. In particular embodiments, during such determinations, the backend server 302 may factor in any time that may be associated with the transfer, such as a time for walking from a drop-off point to a pickup location for the next vehicle, time for purchasing a ticket for the next vehicle, or other suitable time.

During the servicing of the transportation request, backend server 302 may monitor conditions associated with the transportation request at suitable intervals (e.g., periodic) and update any suitable information presented to the drivers and/or passenger, such as expected pickup and drop-off times for each segment, an expected destination arrival time, an expected total cost of the trip or one or more segments, remaining travel time, or other suitable information. Any suitable conditions may be monitored such as any of the information used to select the route. As examples, the location of one or more drivers of the primary transportation service currently servicing or scheduled to service a segment or conditions expected to affect travel time (e.g., weather, traffic) may be monitored. In addition, conditions associated with secondary transportation services may be monitored, such as a current location of a particular vehicle or whether a particular vehicle is running early, on time, or late with respect to the expected schedule. In one embodiment, conditions known to the backend server 302 regarding travel time for automobile traffic (e.g., heavy traffic conditions) may be applied to an expected travel time for a bus or other land vehicle of a secondary transportation service (which could be based on a schedule and/or the current location of the vehicle) to estimate the actual travel time of the bus or other vehicle.

In various embodiments, if the conditions indicate that a transfer from a vehicle of the primary transportation service to a vehicle of the secondary transportation service has been or is likely to be missed, the route may be reconfigured to select an alternative route and the appropriate parties are notified of such. The constraints may also be taken into account in selecting the reconfigured route. As one example, if the first segment of the transportation request is serviced by a car of the primary transportation service and the second segment of the transportation request is serviced by a bus and a determination is made that a bus has already driven past the pickup location of the second segment (or will drive past the pickup location of the second segment before the car can arrive at the pickup location of the second segment), the driver of the car may be rerouted to a different bus stop for that particular bus (or another bus) at which a transfer can be made.

In various embodiments, if the conditions indicate that a more optimal route is available, the route may be dynamically changed and the appropriate parties notified. For example, if a vehicle scheduled to service the second segment of the route is detected as running late, an alternate route that fits the constraints better may be determined and utilized. In various embodiments, the route may be dynamically changed in response to receiving a trigger based notification (e.g., that a vehicle servicing a segment is late or has stopped running).

After the route has been serviced (or at the end of each individual segment), the passenger may have the option of rating the route and/or the individual segments of the route. Such ratings may be used by backend server 302 to improve route suggestions in the future for the particular passenger or for other passengers. The primary transportation service via backend server 302 may also analyze statistics associated with the segments serviced by its drivers to improve its data associated with the secondary transportation services (e.g., backend server 302 may determine whether the predicted pickup time, drop-off time, or travel time was accurate).

In various embodiments, backend server 302 may send information associated with a future segment (e.g., the next segment) of the route to the passenger (e.g., via passenger application logic 218 of passenger computing device 104). This information may be sent at any suitable time, e.g., during the servicing of the current segment of the route. The information may include real-time information associated with the future segment. For example, if the current segment is being serviced by a secondary transportation service and the next segment is to be serviced by the primary transportation service, backend server 302 may send the current location of the driver, instructions on where to go to meet the driver (e.g., which part of a metro exit or an airport to walk to in order to meet the driver), identifying information about the driver or driver's vehicle, or other suitable information to facilitate an easy transition from the current segment of the route to the next segment of the route.

In various embodiments, when the primary transportation service is to service a next segment of the route, the backend server 302 monitors the current location of the passenger (e.g., via GPS) and calculates an expected time remaining until the passenger will arrive at the destination location of the current segment (i.e., the transfer location). The backend server 302 may also monitor the amount of time that is required for one or more drivers within the vicinity of the transfer location and notify one of the drivers to travel to the transfer location. The time at which the backend server 302 sends the driver to the transfer location may be based on the expected time remaining for the passenger on the current segment as well as the time required for the driver to travel to the transfer station. Ideally, the backend server 302 will select a time to notify the driver that will result in the driver arriving simultaneously with (or slightly before) the passenger at the transfer location.

Figure 4:
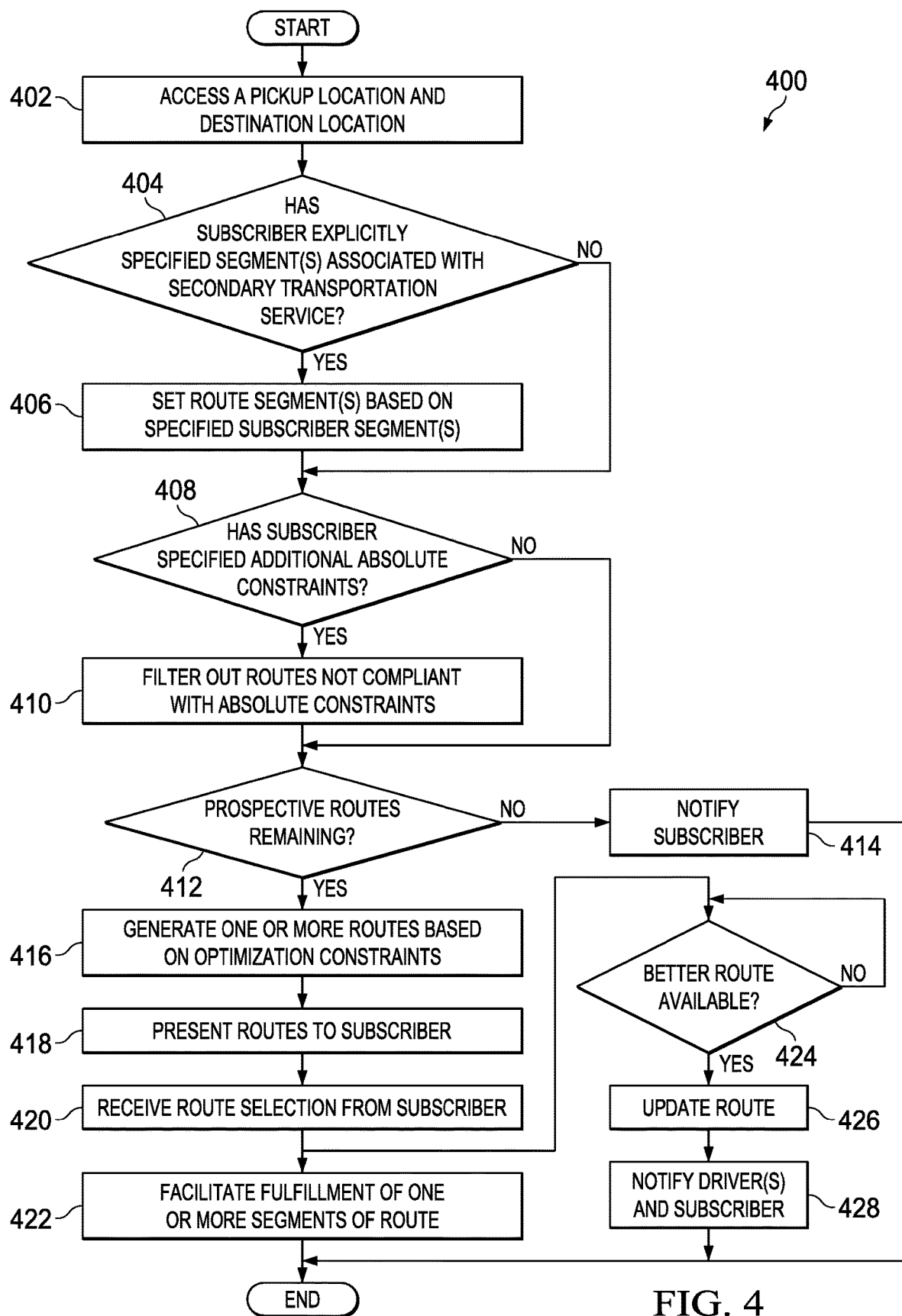
FIG. 4 illustrates a method for generating travel routes to be serviced by a primary transportation service and a secondary transportation service in accordance with certain embodiments.

FIG. 4 illustrates a method 400 for generating travel routes to be serviced by a primary transportation service and a secondary transportation service in accordance with certain embodiments. The steps of FIG. 4 may be performed, for example, by a backend server 302 or passenger computing device 104.

At 402, a pickup location and destination location are accessed. In some embodiments, these values may have been specified by a subscriber to a primary transportation service in association with a transportation request to backend server 302 or may have been selected by backend server 302 (e.g., based on device activity information).

At 404, it is determined whether the subscriber has explicitly specified one or more segments associated with a secondary transportation service. For example, the subscriber may specify, in association with a transportation request for travel from the pickup location to the destination location, that the subscriber would like to ride a particular transportation vehicle (e.g., a particular bus or train) associated with a secondary transportation service. If the subscriber has explicitly specified one or more segments of the route, then at 406, one or more segments of the route are set based on the segment(s) specified by the subscriber.

At step 408, it is determined whether the subscriber has specified any other absolute constraints. If so, routes that are not compliant with the absolute constraints are filtered out (e.g., from a set of prospective routes) at 410. At 412, it is determined whether prospective routes remain. If no prospective routes remain, the subscriber is notified and the method ends. The subscriber may then relax the specified absolute constraints or select a different route that does not meet the absolute constraints.

At step 416, one or more routes are generated based on optimization constraints. For example, the routes that remain after step 410 may be ordered based on their compatibility with one or more optimization constraints selected by the subscriber or the primary transportation service. A list of one or more of these ordered routes may be generated for viewing by the subscriber. The routes are presented to the subscriber at 418. At 420, a selection of one of the routes is received from the subscriber.

At 422, the fulfillment of one or more segments of the route is facilitated. For example, for each segment to be serviced by the primary transportation service, backend server 302 may navigate a driver to pick up the subscriber at the pickup location for the segment and transport the driver to the destination location for the segment. Concurrently with step 422, the backend server 424 may monitor any suitable conditions to determine whether a better route is available. If it is determined that a better route is not available, the backend server 302 may wait a predetermined period of time and then check again for a better route. If a better route exists, the route is updated at 426 and any affected drivers of the primary transportation service and the subscriber are notified at step 428.

Some of the steps illustrated in FIG. 4 may be repeated, combined, modified or deleted where appropriate, and additional steps may also be included. Additionally, steps may be performed in any suitable order or concurrently without departing from the scope of particular embodiments.

Figure 5:
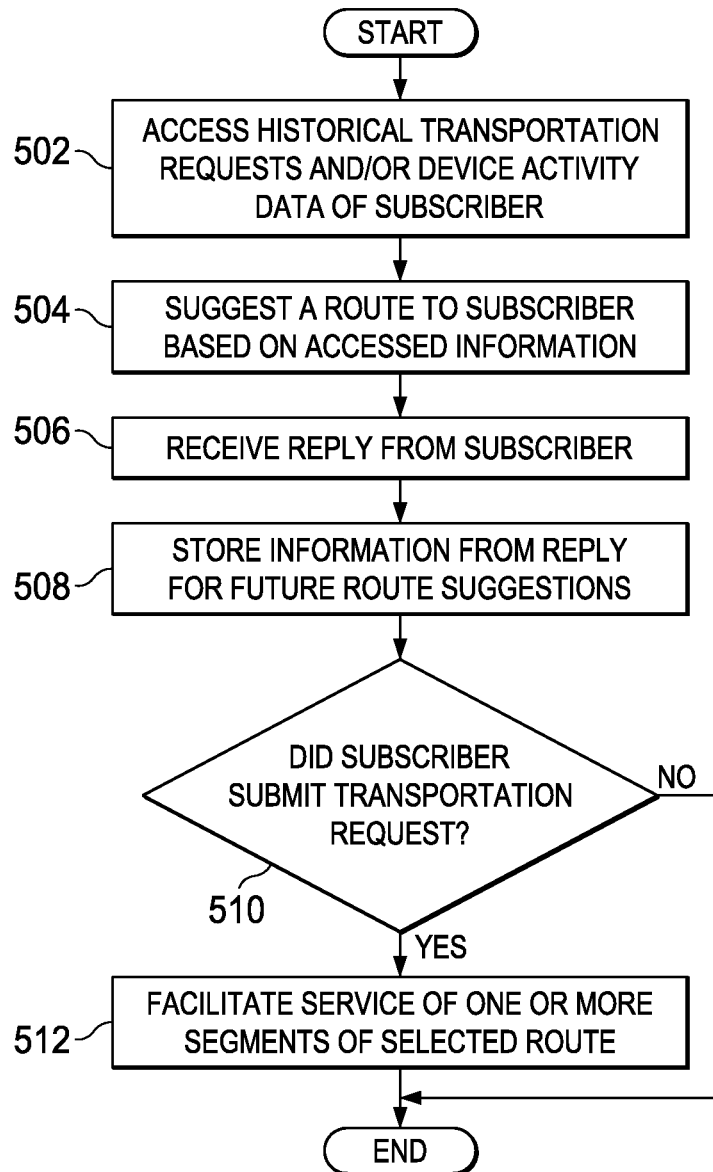
FIG. 5 illustrates a method for improving suggestions of travel routes to be serviced by a primary transportation service and a secondary transportation service in accordance with certain embodiments.

FIG. 5 illustrates a method for improving suggestions of travel routes to be serviced by a primary transportation service and a secondary transportation service in accordance with certain embodiments. The steps of FIG. 5 may be performed, for example, by a backend server 302 or passenger computing device 104.

At 502, historical transportation requests and/or device activity data of a subscriber is accessed. This data may include any of the data mentioned above with respect to both of these items. At 504, a route is suggested to the subscriber based on the accessed information. For example, backend server 302 may analyze the information and determine that the subscriber is likely to submit a transportation request and that the user may benefit from dividing the route into segments served by the primary transportation service and a secondary transportation service. As another example, backend server 302 may receive a transportation request from the subscriber for a particular route and may analyze the information to predict which route the subscriber will like the best and include the route at the top of a list of possible routes for the transportation request.

At 506, a reply is received from the subscriber. The reply may reject the suggested routes, accept one of the suggested routes, or include additional route selection guidance (e.g., may add or delete one or more constraints) with a request to see additional routes. At 508, information from the reply from the subscriber is stored to be used in future route suggestion to the particular subscribers (and optionally to refine suggestions made to other subscribers).

At 510, it is determined whether the subscriber submitted a transportation request. For example, the subscriber may have submitted a transportation request in his reply or may have opted not to submit a transportation request. At step 512, if a transportation request was submitted, service of one or more segments of the selected route is facilitated. For example, backend server 302 may direct one or more drivers to transport the subscriber in accordance with segments to be serviced by the primary transportation service.

Some of the steps illustrated in FIG. 5 may be repeated, combined, modified or deleted where appropriate, and additional steps may also be included. Additionally, steps may be performed in any suitable order or concurrently without departing from the scope of particular embodiments.

It is also important to note that the steps in FIGS. 4-5 illustrate only some of the possible scenarios that may be executed by, or within, the various components of the system described herein. Some of these steps may be deleted or removed where appropriate, or these steps may be modified or changed considerably without departing from the scope of the present disclosure. In addition, a number of these operations may have been described as being executed concurrently with, or in parallel to, one or more additional operations. However, the timing of these operations may be altered considerably. The preceding operational flows have been offered for purposes of example and discussion.

The functionality described herein may also be performed by any suitable component of the system. For example, certain functionality described herein as being performed by backend server 116, may, in various embodiments, be performed by any combination of one or more passenger computing devices 104 or driver computing devices 108 where appropriate. Similarly, certain functionality described herein as being performed by a passenger computing device 104 or a driver computing device 108 may, in various embodiments, be performed by backend server 116 where appropriate.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 as it exists on the date of the filing hereof unless the words "means for" or "step for" are specifically used in the particular claims; and (b) does not intend, by any statement in the specification, to limit this disclosure in any way that is not otherwise reflected in the appended claims.

The invention claimed is:

1. A method comprising:
receiving, from a subscriber device, a transportation request for transportation between a pickup location and a destination location;
determining an absolute constraint indicating a secondary transportation service for a segment of a multi-transportation-service route based on travel speeds of the subscriber device detected during prior transportation requests indicating one or more secondary transportation services;
determining, based on device activity of the subscriber device, a set of optimization constraints indicating optional preferences for one or more segments of a multi-transportation-service route;
generating a first set of routes comprising segments provided by different service providers for transportation between the pickup location and the destination location;
filtering the first set of routes based on the absolute constraint to generate a filtered set of routes comprising the secondary transportation service for the segment;
generating, from the filtered set of routes, a second set of routes comprising the secondary transportation service for the segment and one or more additional segments selected based on the set of optimization constraints; and
providing the second set of routes for display to the subscriber device.

2. The method of claim 1, wherein determining the absolute constraint indicating the secondary transportation service further comprises determining missing data due to lost connections of the subscriber device that corresponds to the prior transportation requests.

3. The method of claim 1, wherein determining the absolute constraint indicating the secondary transportation service comprises determining canceled requests of the subscriber device that corresponds to the prior transportation requests.

4. The method of claim 1, further comprising: during transportation of a first segment of the multi-transportation-service route, sending information associated with a future segment of the multi-transportation-service route to the subscriber device comprising real-time information associated with the future segment, a current location of a driver for the future segment, instructions on where to meet the driver of the future segment, or identifying information about the driver of the future segment.

5. The method of claim 1, further comprising generating the multi-transportation-service route that includes a self-driven vehicle for a segment of the multi-transportation-service route.

6. The method of claim 1, further comprising providing an option to the subscriber device to modify the absolute constraint or select an additional route that does not satisfy the absolute constraint indicating the secondary transportation service.

7. The method of claim 1, wherein the set of absolute constraint further comprises one or more of an arrival time to arrive at a destination location, a maximum cost of transportation, a maximum amount of travel time, a maximum walking distance for the subscriber device to walk between segments of a route, a maximum number of transfers between different transportation vehicles, or a maximum waiting time for transfers between segments.

8. A non-transitory computer readable medium comprising instructions that, when executed by at least one processor, cause a computing device to:
receive, from a subscriber device a transportation request for transportation between a pickup location and a destination location;
determine an absolute constraint indicating a secondary transportation service for a segment of a multi-transportation-service route based on travel speeds of the subscriber device detected during prior transportation requests indicating one or more secondary transportation services;
determine, based on device activity of the subscriber device, a set of optimization constraints indicating optional preferences for one or more segments of a multi-transportation-service route;
generate a first set of routes comprising segments provided by different service providers for transportation between the pickup location and the destination location;

filter the first set of routes based on the absolute constraint to generate a filtered set of routes comprising the secondary transportation service for the segment;

generate, from the filtered set of routes, a second set of routes comprising the secondary transportation service for the segment and one or more additional segments selected based on the set of optimization constraints; and provide the second set of routes for display to the subscriber device.

9. The non-transitory computer readable medium of claim 8, further comprising instructions that, when executed by at least one processor, cause a computing device to determine that the absolute constraint indicates the secondary transportation service by: determining missing data due to lost connections of the subscriber device that corresponds to the prior transportation requests.

10. The non-transitory computer readable medium of claim 8, further comprising instructions that, when executed by the at least one processor, cause the computing device to determine that the absolute constraint indicates the secondary transportation service by determining canceled requests of the subscriber device that corresponds to the prior transportation requests.

11. The non-transitory computer readable medium of claim 8, further comprising instructions that, when executed by the at least one processor, cause the computing device to: send information associated with a future segment of the multi-transportation-service route to the subscriber device during transportation of a first segment of the multi-transportation-service route, the information associated with the future segment comprising real-time information associated with the future segment, a current location of a driver for the future segment, instructions on where to meet the driver of the future segment, or identifying information about the driver of the future segment.

12. The non-transitory computer readable medium of claim 11, wherein the instructions cause the computing device to generate the multi-transportation-service route that includes a self-driven vehicle for a segment of the multi-transportation-service route.

13. The non-transitory computer readable medium of claim 8, wherein the instructions cause the computing device to provide an option to the subscriber device to modify the absolute constraint or select an additional route that does not satisfy the absolute constraint indicating the secondary transportation service.

14. The non-transitory computer readable medium of claim 8, wherein the absolute constraints further comprises one or more of an arrival time to arrive at a destination location, a maximum cost of transportation, a maximum amount of travel time, a maximum walking distance for the subscriber device to walk between segments of a route, a maximum number of transfers between different transportation vehicles, or a maximum waiting time for transfers between segments.

15. A system comprising:
at least one processor; and
a non-transitory computer readable medium comprising instructions that, when executed by the at least one processor, cause the system to:

receive, from a subscriber device, a transportation request for transportation between a pickup location and a destination location;

determine an absolute constraint indicating a secondary transportation service for a segment of a multi-transportation-service route based on travel speeds of the subscriber device detected during prior transportation requests indicating one or more secondary transportation services;

determine, based on device activity of the subscriber device, a set of optimization constraints indicating optional preferences for one or more segments of a multi-transportation-service route;

generate a first set of routes comprising segments provided by different service providers for transportation between the pickup location and the destination location;

filter the first set of routes based on the absolute constraint to generate a filtered set of routes comprising the secondary transportation service for the segment;

generate, from the filtered set of routes, a second set of routes comprising the secondary transportation service for the segment and one or more additional segments selected based on the set of optimization constraints; and provide the second set of routes for display to the subscriber device.

16. The system of claim 15, further comprising instructions that, when executed by the at least one processor, cause the system to: determine that the absolute constraint indicates the secondary transportation service by determining missing data due to lost connections of the subscriber device that corresponds to the prior transportation requests.

17. The system of claim 15, further comprising instructions that, when executed by the at least one processor, cause the system to determine that the absolute constraint indicates the secondary transportation service by determining canceled requests of the subscriber device that corresponds to the prior transportation requests.

18. The system of claim 15, further comprising instructions that, when executed by the at least one processor, cause the system to: send information associated with a future segment of the multi-transportation-service route to the subscriber device during transportation of a first segment of the multi-transportation-service route, the information associated with the future segment comprising real-time information associated with the future segment, a current location of a driver for the future segment, instructions on where to meet the driver of the future segment, or identifying information about the driver of the future segment.

19. The system of claim 15, wherein the instructions cause the system to generate the multi-transportation-service route that includes a self-driven vehicle for a segment of the multi-transportation-service route.

20. The system of claim 15, wherein the instructions cause the system to provide an option to the subscriber device to modify the absolute constraint or select an additional route that does not satisfy the absolute constraint indicating the secondary transportation service.

* * * * *